United States Patent
Nobis et al.

(10) Patent No.: US 8,578,765 B2
(45) Date of Patent: Nov. 12, 2013

(54) METHOD FOR WHEEL SUSPENSION MEASUREMENT AND A DEVICE FOR MEASURING THE WHEEL SUSPENSION GEOMETRY OF A VEHICLE

(75) Inventors: Guenter Nobis, Nuertingen (DE); Steffen Abraham, Hildesheim (DE); Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 13/140,191

(22) PCT Filed: Oct. 20, 2009

(86) PCT No.: PCT/EP2009/063729
§ 371 (c)(1),
(2), (4) Date: Sep. 7, 2011

(87) PCT Pub. No.: WO2010/078976
PCT Pub. Date: Jul. 15, 2010

(65) Prior Publication Data
US 2011/0308309 A1     Dec. 22, 2011

(30) Foreign Application Priority Data
Dec. 19, 2008   (DE) .......................... 10 2008 054 975

(51) Int. Cl.
*G01M 15/00*   (2006.01)
(52) U.S. Cl.
USPC ...................................................... 73/115.07
(58) Field of Classification Search
USPC ............................. 73/115.07, 117.01–117.03
See application file for complete search history.

(56) References Cited

U.S. PATENT DOCUMENTS

| | | | |
|---|---|---|---|
| 5,535,522 A | 7/1996 | Jackson | |
| 6,134,792 A | 10/2000 | January | |
| 6,209,209 B1 * | 4/2001 | Linson et al. | 33/203.12 |
| 6,397,164 B1 | 5/2002 | Nobis et al. | |
| 6,710,866 B1 * | 3/2004 | Adolph | 356/139.09 |
| 7,065,462 B2 * | 6/2006 | Merrill et al. | 702/95 |
| 7,908,751 B2 * | 3/2011 | Nobis et al. | 33/288 |

(Continued)

FOREIGN PATENT DOCUMENTS

| | | |
|---|---|---|
| CN | 1566903 | 1/2005 |
| CN | 1742193 | 3/2006 |

(Continued)

OTHER PUBLICATIONS

International Search Report, PCT International Patent Application No. PCT/2009/063729, Dated Jun. 4, 2010.

*Primary Examiner* — Freddie Kirkland, III
(74) *Attorney, Agent, or Firm* — Kenyon & Kenyon LLP

(57) ABSTRACT

The following features may be carried out: providing a wheel suspension alignment system having four measuring heads situated in a known position with respect to one another; recording a wheel or a measuring target mounted on it in an initial position of the vehicle; shifting the vehicle from the initial position to at least one further position; recording a wheel, or a measuring target mounted on it, of the vehicle standing in the further position; recording a reference target in at least one of the initial position and the further position of the vehicle, and determining from this an absolute scale; carrying out local 3D reconstructions for determining the translation vectors, the rotation vectors and the wheel rotational angles as well as the wheel rotational centers and the wheel rotational axes of the wheels; and determining the wheel suspension alignment parameters of the vehicle.

10 Claims, 4 Drawing Sheets

(56) References Cited

U.S. PATENT DOCUMENTS

| | | | |
|---|---|---|---|
| 7,974,806 B1 * | 7/2011 | Burns et al. | 702/105 |
| 8,127,599 B2 * | 3/2012 | Schommer et al. | 73/117.01 |
| 8,196,461 B2 * | 6/2012 | Abraham et al. | 73/117.01 |
| 8,254,666 B2 * | 8/2012 | Uffenkamp et al. | 382/154 |
| 2004/0039544 A1 | 2/2004 | Merrill et al. | |
| 2009/0216484 A1 * | 8/2009 | Schommer et al. | 702/150 |

FOREIGN PATENT DOCUMENTS

| | | |
|---|---|---|
| CN | 101124454 | 2/2008 |
| CN | 201096626 | 8/2008 |
| DE | 197 57 763 | 7/1999 |
| EP | 1042643 | 10/2003 |
| EP | 1725834 | 11/2006 |
| WO | WO 03/089876 | 10/2003 |
| WO | WO 2005/090906 | 9/2005 |

* cited by examiner

METHOD FOR WHEEL SUSPENSION MEASUREMENT AND A DEVICE FOR MEASURING THE WHEEL SUSPENSION GEOMETRY OF A VEHICLE

FIELD OF THE INVENTION

The present invention relates to a method for wheel suspension measurement and a device for measuring the wheel suspension geometry of a vehicle.

BACKGROUND INFORMATION

A device for determining the wheel geometry and/or the axle geometry of motor vehicles is described in German Patent Application No. DE 197 57 763 and European Patent No. EP 1 042 643 B1, using an optical measuring device having at least two picture recording devices. In this instance, a so-called stereo measuring system is involved, having binocular (stereo) picture recording devices. Such binocular picture recording devices require much effort and are costly.

In other wheel alignment systems, like one that is described, for example, in U.S. Pat. No. 6,134,792, measuring targets having passpoint networks are used, which have to be produced with high precision, and are therefore also costly. Furthermore, in an everyday repair shop environment, such high precision measuring targets are easily damaged or deformed, which leads to uncontrollable measuring errors.

SUMMARY

It is an object of the present invention to provide an axle alignment method that is reliable, cost-effective and supplies accurate measurement values, as well as an associated axle alignment device.

In accordance with example methods and devices for wheel suspension measurement in accordance with the present invention, the wheels or the measuring targets, having monocular picture recording devices, that are mounted on the wheels, are recorded in at least two positions, and the vehicle is moved between these two positions by the rolling of the wheels. In order to be able to determine an absolute scale, a scale-giving element is recorded in addition, in at least one of the positions of the vehicle.

In the example method and corresponding device for wheel suspension measurement according to the present invention, the scale-giving element is a reference target mounted on the vehicle, whose shape or pattern is known, so that the absolute scale is able to be determined by comparison of the picture record of this reference target to reference values.

In the example method and corresponding device for wheel suspension measurement, this scale-giving element is the center of tire contact in a recorded picture of the wheels. This center of tire contact is able to be determined in the recorded picture of the wheel, and its horizontal distance from the monocular picture recording device is able to be ascertained from its angle of observation and its height of observation. From this may be determined the absolute scale for the measuring heads.

In one example method and device for wheel suspension measurement, the specific scale-giving element is recorded only once by a monocular picture recording device, in order that one is able to determine the absolute scale from this. The provision of a plurality of scale-giving elements or the multiple recording of one or more scale-giving elements is able to increase the accuracy of the absolute scale ascertained even more.

In an example method and device for wheel suspension measurement, pictures of the wheels, or the measuring targets mounted on them, of the vehicle to be measured are first taken in an initial position of the vehicle by the measuring heads, and then the vehicle is shifted into at least one further position. In this further position, a further picture recording of the wheels or of the measuring targets mounted on them takes place. Subsequently, at least one measuring head is shifted from an initial position to a final position, and a renewed picture recording of the wheel or the measuring target mounted on it by this measuring head takes place. A stereo measuring system is able to be simulated by this. The positions of the initial position and at least one further position of the measuring head have to be known, in this context, or have to be able to be determined. In another example method and device, a vehicle motion and, in addition to that, a motion of at least one motion of at least one measuring head is undertaken from its initial position to its final position, with the vehicle remaining stationary.

In accordance with the present invention, it is sufficient to determine the absolute scale at only one wheel, because, as described below, one is able to produce a common scale for all the wheels.

In accordance with the present invention, cost advantages may come about, since highly accurate production of optical targets is not required, since one is able to do without a second picture recording device for each measuring head, and since a distance-measuring sensor is not needed.

The methods and devices according to the present invention are able to be implemented with measuring targets and also without measuring targets.

If no measuring targets are used, but the wheels themselves are observed, natural geometrical details of the wheels, such as a rim edge, a valve, a design element or a character on the tire wall is observed.

If measuring targets are used, they do not require a passpoint network, and thus the measuring targets are clearly able to be produced in a more favorable manner, and uncontrollable measuring errors as a result of deformation or damage to precision targets using passpoint networks in an everyday repair shop environment are able to be reliably avoided.

Furthermore, the example methods according to the present invention are easy to carry out and the corresponding devices are easy to operate. If targets are used, exact positioning of the wheel adapters of such targets to the axis of rotation is not required.

Geometrical details present at the wheels or at the targets are recorded, according to the present invention, using monocular picture recording devices in at least two positions.

The evaluation of the monocular picture sequences of at least two pictures of the respective wheel, or the measuring target mounted on it, for determining geometrical variables, takes place using conventional methods of picture processing according to the principle "structure from motion" and its application for three-dimensional wheel suspension measurement.

From the 2D picture coordinates of the pictured geometrical details measured in all the pictures recorded, there are yielded their 3D coordinates in a local wheel coordinate system, the translation vectors and the rotation vectors of the vehicle and the angles of rotation of the wheel between the positions, as well as the data required for the axle alignment in the form of the 3D position of the rotational center and the spatial direction of the rotational axis. This computational step will be designated below as 3D reconstruction.

After the 3D reconstruction has taken place, the positions of the geometrical details in the wheel coordinate system form a passpoint system, so that subsequent measurements may be carried out in a standing vehicle, for example, for setting toe and camber in response to a detected malposition of the wheel. The 3D reconstruction determines only the form of the wheel coordinate system, not its scale. Each monocular picture recording device calculates its associated wheel coordinate system using a local scale, which is optionally specified in the reconstruction.

For those measured values in the axle alignment, which are generally based on the calculation of angles, the scales of all the picture recording devices have to be known neither identically nor absolutely. Only when additionally metric measured values are to be determined or the single toe of the rear wheels, do the local scales have to be adjusted to one another. In the following, a common scale for all picture recording devices is designated as a global scale. By introducing an additional, dimensionally correct, external information, the global scale is adjusted to an absolute scale.

An additional recording of geometrical details at the body increases the accuracy of the determination of the translation vectors and rotation vectors between the positions.

BRIEF DESCRIPTION OF THE DRAWINGS

The present invention is explained in greater detail below on the basis of exemplary embodiments with reference to the figures.

DETAILED DESCRIPTION OF EXAMPLE EMBODIMENTS

Figure 1:
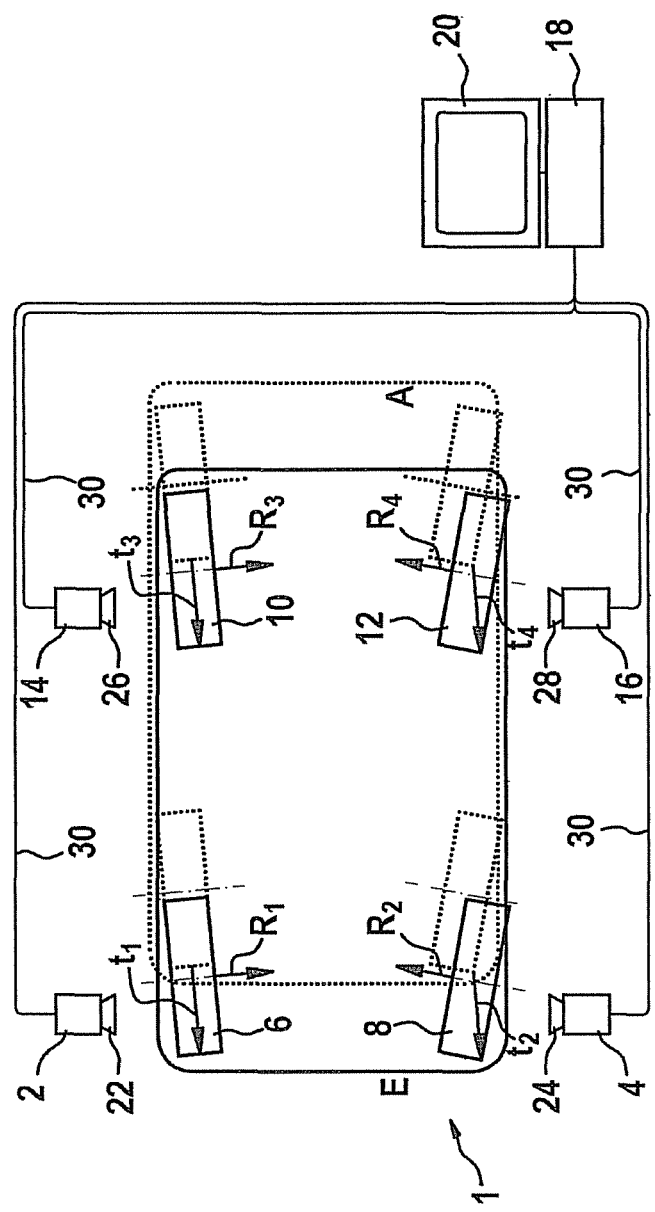
FIG. 1 shows the schematic representation of a device according to the present invention for assessing the wheel suspension geometry of a vehicle, as well as of a vehicle in the initial position and the final position, from above.

FIG. 1 shows the schematic representation of a device according to the present invention for measuring the wheel suspension geometry of a vehicle, from above.

The device has four measuring heads 2, 4, 14, 16, which are situated in each case pairwise opposite one another, on both sides of a vehicle 1. Measuring heads 2, 4, 14, 16, on their side facing vehicle 1, each have a monocular picture recording device 22, 24, 26, 28, which is designed as a camera, for example. The position of measuring heads 2, 4, 14, 16 in the coordinate system of the measuring location is known, and is not changed during the measurement.

Vehicle 1 has four wheels 6, 8, 10, 12, and is situated between measuring heads 2, 4, 14, 16 in such a way that in each case one of wheels 6, 8, 10, 12 is positioned in the field of view of one of picture recording devices 22, 24, 26, 28. Measuring heads 2, 4, 14, 16 are connected via data lines 30 to an evaluation device 18 for evaluating the data recorded and ascertained by measuring heads 2, 4, 14, 16. Evaluation device 18 is connected to a display 20 for indicating the results of the measurement. Furthermore, evaluation device 18 is provided with an input device, not shown in FIG. 1, for instance, a keyboard, for controlling evaluation device 18.

In FIG. 1, vehicle 1 is shown in an initial position A, shown by dotted lines, and a final position E, shown by solid lines. Final position E is located to the left of initial position A, in the horizontal direction.

To carry out the measurement, first of all, each of wheels 6, 8, 10, 12 is recorded in the initial position A of vehicle 1 by, in each case, one of picture recording devices 22, 24, 26, 28, and the position of a geometrical detail of respective wheel 6, 8, 10, 12 is recorded in the local coordinate system of respective measuring head 2, 4, 14, 16.

The geometrical details do not form a passpoint system.

The geometrical details may be natural geometrical details of wheel 6, 8, 10, 12, such as a rim edge, a valve, a design element or a character, or a measuring target mounted on wheel 6, 8, 10, 12. By using the natural geometrical details, the step of mounting and later taking down measuring targets may be saved, so that the measurement can be carried out more rapidly. On the other hand, measuring targets have a high contrast and are thus especially easily detected by picture recording devices 22, 24, 26, 28. Thus, measuring targets make possible an accurate wheel suspension alignment, especially also in response to poor lighting conditions.

Since picture recording devices 22, 24, 26, 28 are monocular picture recording devices 22, 24, 26, 28, the position of the geometrical details in the three-dimensional coordinate system of respective measuring head 2, 4, 14, 16 is able to be determined, only except for an unknown scale factor between a local and an absolute scale, or rather, between a global and an absolute scale, if the local scales have been adjusted to each other.

Figure 2:
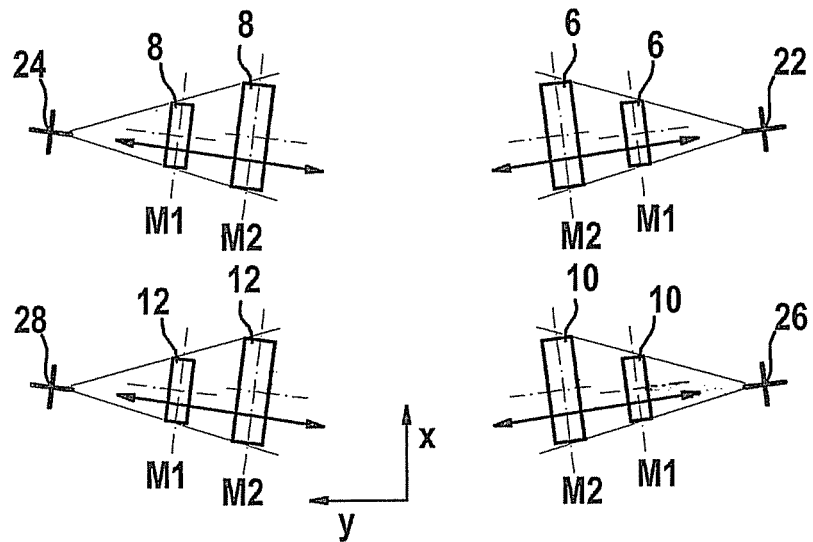
FIG. 2 shows schematically the 3D reconstruction of an axle geometry without a global scale.

FIG. 2 illustrates this scale uncertainty by an example. FIG. 2 shows a 3D reconstruction of wheels 6, 8, 10, 12 for two exemplary scales M1 and M2. In FIG. 2 it becomes clear that a change in scale leads to a scaling of all segment lengths by the same factor. The imaging of a large, distant object, in this case, wheels 6, 8, 10, 12, using scale M2, is identical to wheels 6, 8, 10, 12 diminished in size according to scale using scale M1, which are located at a lower distance from respective picture recording device 22, 24, 26, 28.

Referring again to FIG. 1, vehicle 1 is moved into final position E, and the position of the geometrical details is determined once more, after the position of the geometrical details has been determined in the pictures of initial position A of the vehicle.

From the difference of the geometrical details in the pictures in initial position A of vehicle 1 and final position E of vehicle 1, and the formulation of a three-dimensional motion of a rigid body between the two positions, while introducing the rotational centers, the rotational axles and the rotational angles of the wheels, translation vectors t1, t2, t3 and t4 and rotation vectors R1, R2, R3 and R4 of wheels 6, 8, 10, 12 may now be determined. This may take place either by a logic in respective measuring heads 2, 4, 14, 16 or in evaluation device 18.

For this measurement, since vehicle 1 is to be regarded as a rigid body, the relative position of wheels 6, 8, 10, 12 with respect to one another does not change when vehicle 1 is moved from initial position A to final position E. Translation vectors t1, t2, t3 and t4 of wheels 6, 8, 10, 12 therefore have to have the same length in the global coordinate system. Therefore, the four local scales of measuring heads 2, 4, 14, 16 may be reduced to a common, global scale by scaling translation vectors t1, t2, t3 and t4 in such a way that they have the same length.

For scaling translation, vectors t1, t2, t3 and t4 and for adjusting to a common scale, the recording of all four wheels 6, 8, 10, 12 by picture recording device 22, 24, 26, 28 of measuring heads 2, 4, 14, 16 has to be synchronized in time, so that the four wheels 6, 8, 10, 12 are in each case recorded in the same position of vehicle 1.

In the simplest variant, as was described before, vehicle 1 is stopped in at least two positions, for instance, in an initial position A and a final position E, and the positions of the geometrical details are determined in these two positions of vehicle 1. An additional synchronization of the picture recording times is then not required. Vehicle 1 may also be stopped in further positions, in order to determine the positions of the geometrical details in these positions, and to increase the accuracy of the measurement.

From the measured data, the axis of rotation and the rotational center of wheels 6, 8, 10, 12 may be determined in the coordinate system of the respective measuring head 2, 4, 14, 16, using conventional methods.

This evaluation may be performed by wheel, i.e., separately for all four wheels 6, 8, 10, 12, by axle, i.e., in common for the oppositely situated wheels 6, 8, 10, 12 of an axle, or in common for all the wheels 6, 8, 10, 12. For the evaluation by axle and the evaluation in common for all the wheels 6, 8, 10, 12, a synchronicity in time of the recordings has to be produced.

In addition to the geometrical details of wheels 6, 8, 10, 12, geometrical details on the body of vehicle 1 may be recorded, in order to record steering motions and spring oscillations of vehicle 1 and to compensate for them mathematically.

As described, the 3D coordinates of each measuring head are able to be determined except for a scale factor, i.e., the shape of the reconstructed 3D point cloud is known, but not its magnitude (see FIG. 2). A common scale is obtained from the adjustment of translation vectors t1, t2, t3 and t4, which describe the motion of the geometrical details in space.

From FIG. 2 one is able to recognize, however, that the scaling to form a common scale leads to no change in the angle between the segments. Therefore, these angles, such as the camber of wheels 6, 8, 10, 12, the single toe of the front axle and the total toe of the front and rear axle are independent of the global scale, and are thus able to be determined without knowing the common scale.

Measured quantities which require lengths of segments, by contrast, do depend on a common, absolute scale. This applies, for example, to the calculation of the wheel base and the tread width or the vehicle's longitudinal center plane M, which is needed to calculate the single toe of the rear axle.

The knowledge of the common, absolute scale is not required, however, for calculating the single toe of the rear axle if measuring heads 2, 4, 14, 16 are situated exactly symmetrically on both sides of vehicle 1 to picture recording devices 22, 24, 26, 28, and the motion of vehicle 1 takes place exactly along a straight line through measuring heads 2, 4, 14, 16. Consequently, by a symmetrical positioning of measuring heads 2, 4, 14, 16, or by a symmetrical alignment of vehicle 1 between the rigidly mounted measuring heads 2, 4, 14, 16, an exact determination of longitudinal center plane M of vehicle 1 is able to be made, and with that, the single toe of rear wheels 10, 12 may be determined exactly.

Figure 3:
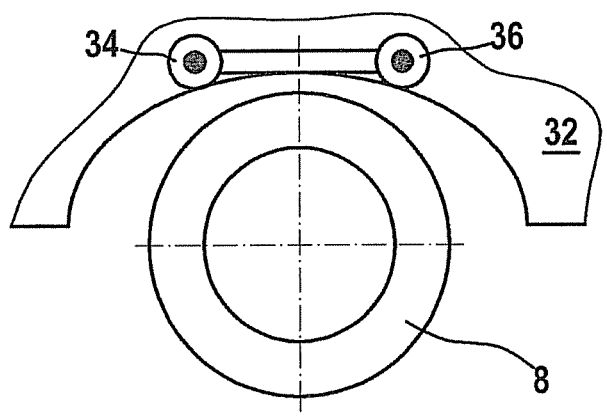
FIG. 3 shows a schematic side view of the left front wheel and of the area of the body surrounding the left front wheel according to an exemplary embodiment of a device, according to the present invention, for measuring the wheel suspension geometry of a vehicle.

FIG. 3 shows a schematic side view of left front wheel 8, and of the region of body 32 surrounding left front wheel 8, according to one exemplary embodiment of the present invention.

This area of body 32 is a fender. Two reference targets 34 and 36 are mounted on the fender above the wheel well edge. Reference targets 34 and 36 are developed as flat circular markings, and their diameter is adjusted to the optical picture taking relationships between the object space and the picture plane of picture recording device 22, 24, 26 and 28. Reference targets 34 and 36 include a known pattern, which is developed in FIG. 3, in exemplary fashion, as a concentric dark reference point and as a surrounding, bright, particularly reflecting circular ring. The diameter of the dark reference point and the dimension of the bright circular ring surrounding it are known.

In practice, it has turned out that the development, shown in FIG. 3, of reference targets 34 and 36 having a dark concentric reference point and a bright, particularly reflecting circular ring surrounding it, is recognized especially reliably by the picture recording devices. Other shapes are also possible for the reference targets, however.

During operation of the example device for measuring the wheel suspension geometry according to FIG. 1, at least one of the two reference targets 34 and 36 is recorded together with wheel 8 or the target mounted on it. By comparing the pictures of the at least one recorded reference target 34 and 36 to the actual geometrical dimensions for this reference target, that is known to the evaluation device, the absolute scale is able to be determined. In this context, it is sufficient if one of the two reference targets 34 and 36 is recorded in a vehicle position, particularly the initial position or the final position of the vehicle. Further recordings are able to increase the accuracy of the determination of the absolute scale.

Because of the translation vectors, rotation vectors and the wheel angles between the at least two vehicle positions that are able to be determined according to the present invention, of the wheel rotational centers and of the wheel rotational axes of the wheels, and because of the determination of the absolute scale for the measuring heads, all relevant wheel suspension alignment parameters are able to be determined with great accuracy, especially camber, single and/or total toe, wheelbase and tread width.

Figure 4:
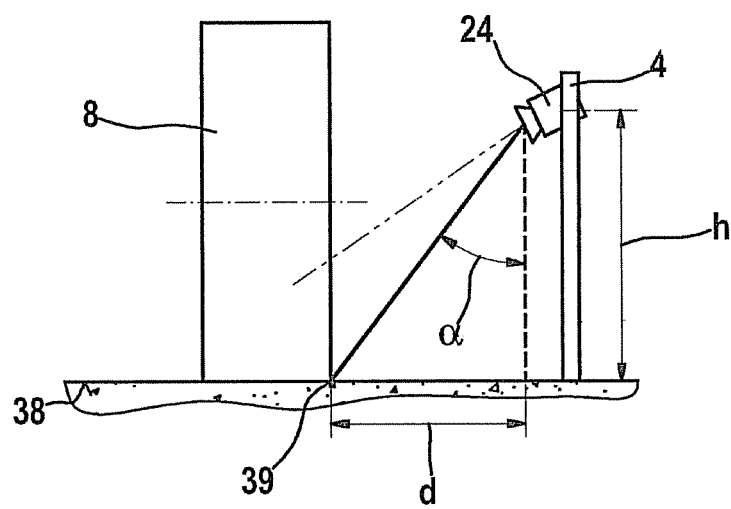
FIG. 4 shows a schematic front view of the left front wheel and the left front measuring head situated next to it, according to an additional exemplary embodiment of a device, according to the present invention, for measuring the wheel suspension geometry of a vehicle.

FIG. 4 shows a schematic front view of left front wheel 8, body 32 having been omitted for viewing reasons, and left front measuring head 4 situated next to it, according to one exemplary embodiment of the present invention.

Picture recording device 24 of measuring head 4 is positioned at a height h above roadway plane 38, and it is aligned at an angle $\alpha$ to the vertical and thus to an angle 90°—$\alpha$ to roadway plane 38.

During operation of the device according to the present invention, for measuring the wheel suspension geometry of a vehicle, picture recording device 24 records a picture area of front wheel 8 that is big enough for center of tire contact 39 to be included in it. A picture evaluation permits determining the center of tire contact, for instance, as the border between the dark tire and the brighter measuring location, and horizontal distance d of this center of tire contact to picture recording device 24 may be determined with the aid of known height h and known alignment angle $\alpha$. One thereby obtains the absolute scale, so that all relevant wheel suspension parameters, especially camber, single toe and/or total toe, wheelbase and tread width are able to be ascertained.

As in FIG. 3, here too a one-time observation of center of tire contact 39, for instance, in the initial position or the final position of the vehicle, is sufficient for determining the absolute scale, and by making several observations, the accuracy of the absolute scale determined may still be improved.

In other words, according to FIG. 4, a 3D coordinate associated with center of tire contact 39 is able to be calculated in global coordinate system H at any time j of the measurement as the intersection of the picture recording beam with the roadway plane. The scale missing for the 3D reconstruction is able to be determined.

With the aid of its Subfigures 5(a) and 5(b), FIG. 5 shows schematic side views of left front wheel 8 and the area of body 32 that surrounds left front wheel 8, as well as a picture recording device 24, situated next to it, according to further exemplary embodiments of the present invention.

Figures 5A, 5B:
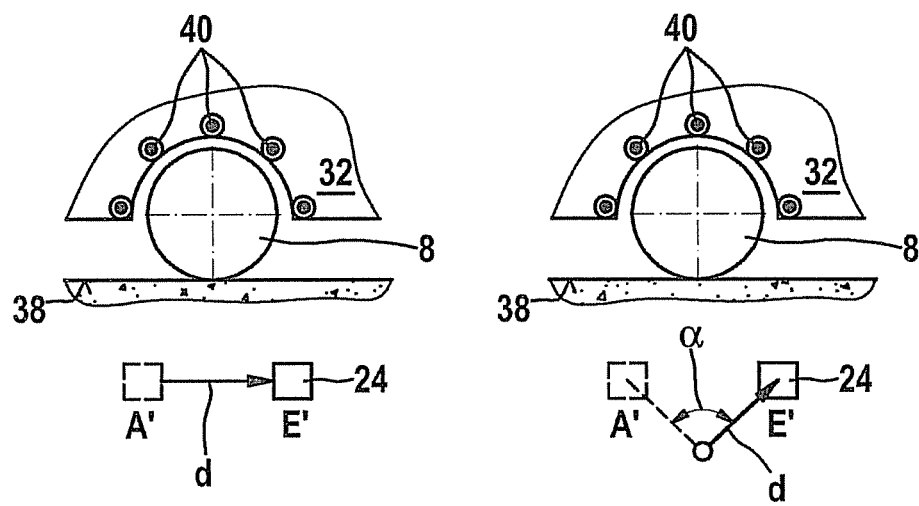
FIG. 5 shows with the aid of its Subfigures 5(a) and 5(b), a schematic side view of the left front wheel and of the region of the body surrounding the left front wheel, as well as a picture recording device situated next to it according to a further exemplary embodiment of a device, according to the present invention, for measuring the wheel suspension geometry of a vehicle.

FIGS. 5(a) and 5(b) show schematically measuring targets 40 on the fender, particularly situated on the wheel well edge, but on wheel 8 no measuring target is shown. According to the present invention, it is possible to observe both the wheel directly and a target affixed to it. Measuring targets 40 on body 32 are optional in this case, and may also be omitted.

The actual measurement by measuring heads 2, 4, 14, 16 takes place, as was described with reference to FIG. 1, by recording the targets of wheels 6, 8, 10, 12 or the targets mounted on them by measuring heads 2, 4, 14, 16 at least in initial position A and in final position E of vehicle 1, and the vehicle is moved between the two.

FIGS. 5(a) and 5(b) show an additional specific embodiment for determining the missing scale. The required measurements of the picture recording devices from their initial position A' and their final position E' take place in the case of a vehicle at standstill, in this instance. In particular, vehicle 1 stands either in its initial position or in its final positions, in this context.

The picture recording devices make a first picture recording of the wheel and of the target mounted on it from initial position A' and a second picture recording of the wheel and of the target mounted on it from final position E'. In between, the picture recording devices are moved from their initial position A' to their final position E', as is shown schematically in FIGS. 5(a) and 5(b) for left front picture recording device 24. Accordingly, a stereo measuring camera system is simulated.

It is sufficient to carry out such picture recordings and such a displacement using only one measuring head. The absolute scale for one wheel is able to be determined thereby, for, one is able to produce a common scale for all the wheels, after all.

Initial position A' and final position E' of the picture recording devices are known to, or determinable by the evaluation device, for instance, initial position A' and the direction and length of the displacement motion may be known to the evaluation device, so that final position E' is able to be ascertained from it.

By the recording of the wheels or the targets mounted on the wheels from at least two known, different camera positions, the global scale is transferred to the wheels and to the measuring targets on the wheels, and consequently entered into the 3D reconstruction. The absolute scale may thus be determined, and according to the present invention, the relevant vehicle parameters, especially camber, single and/or total toe, wheelbase and tread width are able to be determined.

In the exemplary embodiment of FIG. 5(a), measuring head 4 has a linear position transducer which moves picture recording device 24 from initial position A' into final position E' by a specified path.

In the alternative exemplary embodiment of FIG. 5(b), measuring head 4 has a rotating unit by which picture recording device 24, situated on a supporting bracket of same, is able to be rotated by a specified angle α about the axis of rotation. Picture recording device 24 is fastened to the supporting bracket particularly eccentrically, with respect to the axis of rotation, in this instance.

Figure 6:
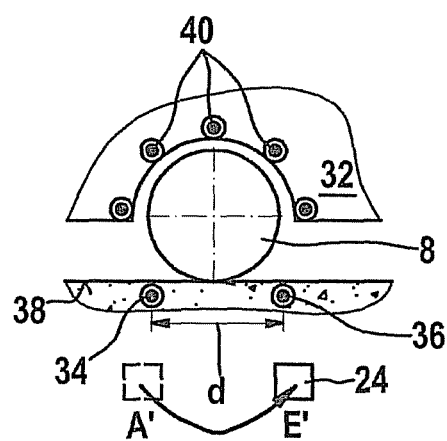
FIG. 6 shows a schematic side view of the left front wheel, of the region of the body surrounding the left front wheel and of two reference targets at the measuring location, as well as a picture recording device situated next to it, according to an additional exemplary embodiment of a device, according to the present invention, for measuring the wheel suspension geometry of a vehicle.

FIG. 6 shows a schematic side view of left front wheel 8, of the area of body 32 surrounding left front wheel 8 and of two reference targets 34, 36 at the measuring location, as well as a picture recording device 24 situated next to it, according to one exemplary embodiment of the present invention.

The representation of wheel 8 and body 32 agrees with the representation according to FIG. 5. As in FIG. 5, in this exemplary embodiment too, the actual measurement by measuring heads 2, 4, 14, 16 takes place, as was described with reference to FIG. 1, by recording the targets of wheels 6, 8, 10, 12 or the targets mounted on them by measuring heads 2, 4, 14, 16 at least in initial position A and in final position E of vehicle 1, and picture recording device 24 is moved from an initial position A' to a final position E', with the vehicle standing still. This is indicated in FIG. 6 by an arrow.

To increase the accuracy, or if at least one of positions A' and E' is not exactly known, at the measuring location, for instance, at the lifting platform, two additional reference targets 34 and 36 may be situated in the field of view of picture recording device 24, whose distance d from each other is known to the evaluating device.

When, in the two positions A' and E', in addition to recording wheel 8 or the measuring target fastened to it, recording takes place of reference targets 34 and 36, distance d between the two reference targets 34 and 36, that is determinable by a picture evaluation, is able to be compared to the stored reference value, and thus the absolute scale is able be determined. Because of this, all the relevant wheel suspension alignment parameters, particularly camber, individual and/or total toe, wheelbase and tread width are able to be ascertained.

In other words, the absolute scale is able to be introduced by the two additional reference targets 34 and 36, and entered into the 3D reconstruction.

The exactness of the determinations of the absolute scale may be improved if reference targets 34 and 36 are recorded and evaluated in several positions of picture recording device 24 during the movement from position A' to E'. These picture recordings are able to take place simultaneously with the recording of wheel 8 or the measuring target mounted on it, so that, because of the method "structure from motion", all targets are able to be determined in one common coordinate system.

According to alternative exemplary embodiments, the shifting of the at least one picture recording device 24 for all variants according to FIGS. 5(a), 5(b) and 6 is also able to take place during the motion of vehicle 1.

To give an example, the shifting of picture recording device 24 from its initial position A' to its final position E' is able to take place during the shifting of vehicle 1 from its initial position A to its at least one further position E. If one records only two pictures at positions A and E of vehicle 1, this procedure provides a saving in time. While vehicle 1 is being moved from A to E, one is also already simultaneously changing the position of picture recording device 24 from its initial position A' to its final position E'. All picture recording takes place on a standing vehicle 1.

If one records more than two positions of vehicle 1, in order to evaluate a picture sequence, and if one simultaneously also moves picture recording device 24 from A' to E', the shifting of picture recording device 24 has to be known at each point in time, and not only at positions A' and E'. This is possible in a simple way in the methods according to FIGS. 5(a), 5(b) if one designs the mechanics and the measuring technique correspondingly. In the example method according to FIG. 6 this is possible when three reference targets are present, whose distances from one another are known.

What is claimed is:

1. A method for wheel suspension alignment for a vehicle, comprising:
providing a wheel suspension alignment system having four measuring heads situated in a known position with respect to one another, each having a monocular picture recording device, a relative position of the measuring heads with respect to one another being known;
recording in each case one of one wheel or a measuring target mounted on one wheel in an initial position of the vehicle, using each of the four measuring heads;
shifting the vehicle from the initial position to at least one further position;
recording in each case one of one wheel or a measuring target mounted on one wheel of the vehicle standing in the further position, using each of the four measuring heads;
recording a reference target having a known pattern mounted on the vehicle, using one of the four measuring heads in at least one of the initial position and the further position of the vehicle;
measuring a geometrical dimension of the recorded reference target;
comparing the measured geometrical dimension to an actual geometrical dimension of the recorded reference target;
identifying from the comparing an absolute scale for obtaining an actual value from a measured value;
carrying out local 3D reconstructions for determining translation vectors, rotation vectors and wheel rotational angles between the positions, as well as wheel rotational centers and wheel rotational axes of the wheels; and
determining wheel suspension alignment parameters of the vehicle including at least one actual value of at least one of camber, single toe, total toe, wheelbase, and thread width using the absolute scale.

2. A method for wheel suspension alignment for a vehicle, comprising:
providing a wheel suspension alignment system having four measuring heads situated in a known position with respect to one another, each having a monocular picture recording device, a relative position of the measuring heads with respect to one another being known;
recording in each case one of one wheel or a measuring target mounted on one wheel in the initial position of the vehicle, using each of the four measuring heads;
shifting the vehicle from the initial position to at least one further position;
recording in each case one of one wheel or a measuring target mounted on one wheel of the vehicle standing in the further position, using each of the four measuring heads;
ascertaining a center of tire contact as a scale-giving element in at least one of the initial position and the further position of the vehicle and determining an absolute scale for obtaining an actual value from a measured value while determining a horizontal distance of the center of tire contact from the monocular picture recording device from an angle of observation and a height of observation of the monocular picture recording device;
carrying out local 3D reconstructions for determining translation vectors, rotation vectors, and wheel rotational angles between the positions, as well as wheel rotational centers and wheel rotational axes of the wheels; and
determining wheel suspension alignment parameters of the vehicle including at least one actual value of at least one of camber, single toe, total toe, wheelbase and tread width using the absolute scale.

3. A method for wheel suspension alignment, comprising:
providing a wheel suspension alignment system having four measuring heads situated in a known position with respect to one another, of which each has a monocular picture recording device, a relative position of the measuring heads with respect to one another being known;
recording in each case one of one wheel or a measuring target mounted on one wheel in an initial position of the vehicle, using each of the four measuring heads;
shifting the vehicle from the initial position to at least one further position;
recording in each case one wheel or a measuring target mounted on one wheel of the vehicle standing in the further position, using each of the four measuring heads;
recording one of at least one stationary wheel or a measuring target mounted on at least one stationary wheel by a measuring head located in an initial position;
shifting the measuring head from the initial position to at least one further position;
recording the one of wheel or the measuring target mounted on the wheel by the measuring head located in the further position;
carrying out local 3D reconstructions for determining translation vectors, rotation vectors, and wheel rotational angles as well as wheel rotational centers, and wheel rotational axes of the wheels from the recorded pictures of the wheels or the measuring targets mounted on the wheels;
determining an absolute scale for obtaining an actual value from a measured value from the recordings of a wheel or the measuring target mounted on the wheel from the initial position and from the at least one further position of at least one measuring head; and
determining wheel suspension alignment parameters of the vehicle including at least one actual value of at least one of camber, single toe, total toe, wheelbase, and tread width using the absolute scale.

4. The method as recited in claim 3, wherein the shifting of the at least one measuring head takes place at least one of using a linear position transducer or using a rotating unit on which the measuring head is mounted eccentrically with respect to a center of rotation.

5. The method as recited in claim 3, wherein the initial position before the shifting and the at least one further position after the shifting of the at least one measuring head are known.

6. The method as recited in one of claim 3, wherein, to determine the shifting from an initial position and the at least one further position of the at least one measuring head, two reference targets having a known distance of separation on a body are recorded on the wheel or at the measuring location by the measuring head in its initial position and in its at least one further position.

7. A device for measuring a wheel suspension geometry of a vehicle, comprising:

a system of four measuring heads situated in a known position with respect to one another, of which each having a monocular picture recording device, which is equipped to record during operation a picture in each case of one wheel or a measuring target mounted on one wheel of the vehicle in an initial position and in a further position of the vehicle as well as a picture of a reference target mounted on the vehicle having a known pattern in at least one of the initial position and the further position of the vehicle; and an evaluating device that is equipped to determine during operation translation vectors and rotation vectors of the wheels from the pictures of the wheels or the measuring targets mounted on the wheels, in the initial position and in the further position of the vehicle, determine an absolute scale for obtaining an actual value from a measured value from the picture of a scale-giving element, and determine wheel suspension alignment parameters of the vehicle including at least one actual value of at least one of camber, single toe, total toe, wheelbase, and tread width using the absolute scale.

8. A device for measuring a wheel suspension geometry of a vehicle, comprising:

a system of four measuring heads situated in a known position with respect to one another, of which each has a monocular picture recording device, which is equipped to record in operation a picture in each case of a wheel or a measuring target mounted on one wheel, of the vehicle, in an initial position and in a further position of the vehicle; and an evaluating device that is equipped to determine during operation the translation vectors and the rotation vectors of the wheels from the pictures of the wheels or the measuring targets mounted on the wheels, in the initial position and in the further position of the vehicle, to ascertain, in a picture of the wheels or the measuring targets mounted on the wheels, the center of tire contact as a scale-giving element and to ascertain its horizontal distance of separation from the monocular picture recording device from its angle of observation and its height of observation, and to determine from this an absolute scale for obtaining an actual value from a measured value, and to determine wheel suspension alignment parameters of the vehicle including at least one actual value of at least one of camber, single toe, total toe, wheelbase, and the tread width using the absolute scale.

9. A device for measuring the wheel suspension geometry of a vehicle comprising:

a system of four measuring heads situated in a known position with respect to one another, of which each has a monocular picture recording device, which is equipped, in operation, to record a picture in each case of a wheel or a measuring target mounted on one wheel of the vehicle, at least one of the measuring heads having at least one shifting device that is equipped to move the monocular picture recording device between an initial position and at least one further position; and an evaluation device, which is equipped to determine in operation translation vectors and rotation vectors of the wheels from the pictures of the wheels or the measuring targets mounted on the wheels, in the initial position and in the further position of the vehicle, to determine an absolute scale for obtaining an actual value from a measured value from the recordings of a wheel or the measuring target mounted on the wheel from the initial position and from the at least one further position of at least one measuring head, and to determine wheel suspension alignment parameters of the vehicle including at least one actual value of at least one of camber, the single toe, total toe, wheelbase and tread width using the absolute scale.

10. The device as recited in claim 9, wherein the shifting device of the at least one measuring head is one of a linear position transducer, or a rotating unit on which the measuring head is mounted eccentrically with respect to the center of rotation.

* * * * *

UNITED STATES PATENT AND TRADEMARK OFFICE
CERTIFICATE OF CORRECTION

PATENT NO. : 8,578,765 B2  
APPLICATION NO. : 13/140191  
DATED : November 12, 2013  
INVENTOR(S) : Nobis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this
Twenty-second Day of September, 2015

Michelle K. Lee
*Director of the United States Patent and Trademark Office*